Patented Oct. 23, 1934

1,977,664

UNITED STATES PATENT OFFICE 1,977,664

ACETYLATING CELLULOSE

Edward Chauncey Worden, 1st, Millburn, N. J., assignor to Hanson & Orth, New York, N. Y., a firm composed of Charles D. Orth, Sr., and Charles D. Orth, Jr., Michael J. Smith, and William Knight, Jr.

No Drawing. Application October 14, 1933, Serial No. 693,683

6 Claims. (Cl. 260—101)

This invention is a continuation-in-part of my Serial Number 499,534, filed December 2, 1930.

This invention relates to a process for the production of acetylized derivatives of cellulose usually spoken of as cellulose acetate, and specifically to the product obtained therefrom, as the result of disclosures contained in my pending application referred to above, and has for one of its objects the preparation of such acetylated cellulose derivatives of great technical importance by virtue of the fact that they possess high tensile strength both in the dry and wetted condition, are of high elasticity and resiliency and produce films and filaments as well as plastic masses of great stability and of a ready solubility in a large number of the relatively inexpensive organic solvents and solvent combinations which are readily obtained in commerce.

My product consists of or comprises acetylated Musa fiber cellulose, or cellulose acetate obtained by the esterification of purified Musa fiber cellulose, or alphacellulose obtained by the proper purification of Musa fiber or Musa fiber cellulose.

It has been shown, and it is believed is generally recognized in the cellulose and cellulose ester art, that other factors being equal the tensile strength of an esterified cellulose, especially wherein the esterification is an acetylation, is in direct proportion to the initial strength of the cellulose used as the basic or starting material for the esterification process. This is readily exemplified in the fact that wood pulp cellulose is less expensive than cotton cellulose when properly prepared for esterification purposes, wood cellulose acetate speaking in generalities, being of less strength in the acetated state and less desirable in other respects than is cellulose acetate prepared from cotton cellulose, other factors being substantially equal.

It has been shown that a highly purified cellulose may be obtained from Musa fiber, and one that is high in alpha-cellulose and relatively low in hemi-cellulose and other cellulosic bodies of relatively inferior strength, and it has furthermore been shown that such alpha-cellulose or alpha-celluloses, especially in the esterified condition, are extraordinarily strong and readily susceptible to esterification under such conditions as to transmit the strength of the original cellulose or alpha-cellulose to the esterified product obtained therefrom, and it is this esterified product which forms the subject matter of this invention.

One of the objects of this invention, therefore, is the preparation of Musa cellulose acetate from Musa cellulose and especially the utilization of the product obtained as the result of such acetylation. I have found that Musa cellulose acetate, that is, cellulose obtained from purified Musa fiber when in the acetylated condition may be obtained with maximum conversion of the desirable qualities of high tensile strength, elasticity, solubility and other desirable physical constants, when the Musa cellulose is acetylated, of which two illustrative examples are appended hereto, it being understood however that they are given merely for illustrative purposes, and the method or methods may be departed from in many particulars, the product obtained being restricted to the description in the appended claims.

Example I.—Three and one-half parts acetic anhydride of commercial strength, equivalent to at least 2.90 parts of absolute acetic anhydride, and of required purity are slowly added, preferably by means of a spray and with continual agitation to one part of bone dry Musa fiber cellulose (alpha-cellulose obtained from the purification of Musa fiber cellulose), after which is added 3.9 to 4.3 parts glacial acetic acid, agitation being continued and the temperature kept preferably at 20° C. or lower until the cellulose has substantially passed into solution, or at least gelatinized, after which there is atomized on and into the mass while being stirred, from 2% to 10% of finely powdered phosphorous pentoxide (phosphoric anhydride). After maintaining the temperature at not above about 20° C. for a further period of one-half hour after all the phosphorous pentoxide has been added, the temperature is allowed to rise to its normal maximum, where it is kept until a test portion withdrawn responds to the tests for the particular grade or kind of acetylcellulose desired, depending upon the particular use to which the completed product is to be put. When the acetylation has reached the stage wherein the solution or mass appears homogeneous to the naked eye, and where upon examination with a lens only a small amount of undissolved or partially dissolved fibers are apparent, the temperature is allowed to rise to about 50° C. or maintained at that temperature until the viscosity fluidity and other properties desired have been attained, when acetylating is stopped by the addition of a small portion of water, or water admixed with a cellulose acetate solvent as acetic acid, sufficient water being introduced to at least convert the remaining acetic anhydride into acetic acid. It is also usual and preferable to cool the mixture to 20° to 30° depending upon the amount of free acetic anhydride contained therein, before the addition of water, for the normal rise in temperature of the acetylization mass is dependent upon the amount of free or uncombined acetic anhydride contained therein, the larger the proportion of acetic anhydride, the more heat liberated in the mass upon the addition of the requisite amount of water.

The partial hydrolysis or hydration induced by the addition of water in excess of that required to transform acetic anhydride into acetic acid, and the temperature of subsequent ripening and the period of the ripening phase, is governed by the physical constants desired in the finished ester, as is well known to those skilled in the art to which this invention appertains. When the desired solubility condition has been attained the mass is precipitated by commingling water therewith, usual with violent agitation, and the flocculent, white, amorphous, water-insoluble Musa cellulose acetate obtained, is washed to neutrality, stabilized and the moisture removed therefrom, all by ways now known.

Instead of proceeding as above outlined for the esterification of Musa cellulose, the phosphorous pentoxide admixed with glacial acetic acid may be first incorporated with the cellulose and allowed to stand with governing of temperature for several hours, little or no acetylation taking place during this step in the process. Then the acetic anhydride, or a mixture of acetic anhydride and glacial acetic acid may be added if all the acetic acid required has not previously been incorporated with the cellulose, and subsequent steps in the process carried out as above indicated.

The product obtained is a white, amorphous, fluffy, neutral, tasteless powder or masses, insoluble in water and substantially unaffected thereby, soluble in acetone and a wide range of organic solvents used for dissolving acetylated cellulose, and of abnormally high tensile strength and elasticity. However, due to its augmented strength ("toughness") in the non-esterified and esterified condition, acetylated Musa cellulose in general dissolves slower than does other forms of acetated cellulose, but the solubility factor is not diminished thereby, only a comparatively longer time is required to place the ester in solution.

*Example II.*—A mixture of sulfuryl chloride and phosphorus pentoxide, equal weights of each are made, and this added in 2% to 10% based on the weight of Musa cellulose, admixed with acetic acid glacial of the range of proportions previously stated, is added slowly to bone dry Musa cellulose of high degree of purity with agitation and under temperature control as previously indicated. After the mixture of sulfuryl chloride, phosphorus pentoxide and acetic acid has been in contact with the cellulose for a period of 1 to 4 hours, during which time little or no cellulose acetylation is found to have taken place, acetic anhydride commercial equivalent to 2.8 to 3.1 parts absolute acetic anhydride based on the dry weight of the Musa cellulose is added, and temperature control maintained substantially as previously indicated and for a period of until a sample withdrawn and precipitated is found to give the reactions required for the purposes indicated in the finished product, and also when examination shows the practical absence of undissolved fibers, the remaining free acetic anhydride is neutralized by an excess of water after the mass has been reduced to room temperature or thereabouts, and the mass allowed to remain at the ripening or partial hydration temperature until a test sample withdrawn, precipitated washed to neutrality and dried, responds to the tests of solubility, stability, viscosity, etc. desired, depending upon the purpose intended for the finished product. When this stage is reached, the material is rapidly precipitated by the addition of excess of water, neutralized and dried in the usual manner.

Other examples might be cited wherein Musa cellulose may be acetylated to a product superior in tensile strength to the acetated product of wood cellulose or cotton cellulose, which are the only two sources of cellulose used commercially for cellulose acetylation purposes insofar as I am aware, and also superior in other respects, except as to speed of solution in volatile solvents. However, as is well known, viscosity and solubility may be markedly modified during a step in the acetylation process, and Musa cellulose acetate is susceptible to such changes, so that it is possible by a diminution in viscosity, to augment the speed of solution within relatively wide limits.

As an indication of the relative superiority of Musa cellulose acetate over acetated wood pulp or cotton pulp in the acetated condition, it may be said that in experiments wherein the three sources of cellulose were acetated simultaneously under substantially identical optimum conditions, and the operation carried out in substantially the same manner as above outlined, the following comparative constants were found, basing acetylated purified wood cellulose as 100, that is, the standard:

|  | Acetylated | | |
| --- | --- | --- | --- |
|  | Wood | Cotton | Musa |
| Tensile strength in film form | 100 | 115 | 135–145 |
| Elasticity in film form | 100 | 108 | 112–122 |
| Speed of solution | 100 | 94 | 88–80 |
| Viscosity | 100 | 92 | 87–78 |
| Ash | 100 | 104 | 92–80 |
| Original alphacellulose per cent | 91 | 98 | 96–98 |

Furthermore, solutions in neutral solvents and solvent combinations have been kept under normal atmospheric conditions for many months without detectable change or the development of noticeable acidity or diminution in tensile strength and/or viscosity.

What I claim is:

1. As a new article, white, fluffy, inodorous, tasteless, neutral, water-insoluble acetic acid ester of Musa cellulose having substantially greater strength in the deposited condition after having once being placed in solution, than similarly prepared acetated wood cellulose and/or acetated cotton cellulose deposited from a solvent.

2. As a new article neutral, structureless, water-insoluble Musa cellulose acetate, having substantially greater strength in the deposited condition after having been dissolved and the solvent removed therefrom, than similarly prepared acetated wood cellulose or acetated cotton cellulose.

3. As a new article, homogeneous, solvent deposited acetic acid ester of Musa cellulose having substantially greater strength and slower solubility than similarly prepared wood cellulose acetate or cotton cellulose acetate.

4. As a new article, homogeneous, solvent deposited acetic acid ester of alphacellulose obtained from Musa cellulose having substantially greater strength than similarly prepared acetic acid esters of wood cellulose or of cotton cellulose.

5. As a new article, homogeneous, solvent deposited acetic acid ester of purified cellulose from Musa fiber, having a tensile strength in the dry condition of about 15% more than acetated cotton cellulose, and 35% to 45% more than acetated wood cellulose, when all have been dissolved and the solvent contained in each removed.

6. As a new article, homogeneous, solvent deposited acetic ester of purified Musa fiber cellulose, having an elasticity of about 12% to 22% greater than a similarly acetated cotton cellulose or wood cellulose.

EDWARD CHAUNCEY WORDEN, I.